(12) United States Patent
Glesius et al.

(10) Patent No.: US 7,910,893 B2
(45) Date of Patent: Mar. 22, 2011

(54) B10 NEUTRON DETECTOR IN PIE SHAPED SECTORS

(75) Inventors: Frederick L. Glesius, Brecksville, OH (US); Eric Martin Weissman, Chagrin Falls, OH (US); Thomas Robert Anderson, Perry, OH (US)

(73) Assignee: General Electric Company, Schenectadyn, NY (US)

( * ) Notice: Subject to any disclaimer, the term of this patent is extended or adjusted under 35 U.S.C. 154(b) by 184 days.

(21) Appl. No.: 12/422,566

(22) Filed: Apr. 13, 2009

(65) Prior Publication Data

US 2010/0258735 A1 Oct. 14, 2010

(51) Int. Cl.
*G01T 3/00* (2006.01)
(52) U.S. Cl. .................................. 250/390.01
(58) Field of Classification Search ..... 250/390.01–390.12, 385.1, 269.1–269.8
See application file for complete search history.

(56) References Cited

U.S. PATENT DOCUMENTS

| | | | |
|---|---|---|---|
| 2,475,137 A | 7/1949 | Herzog | 250/266 |
| 3,013,156 A | 12/1961 | Hearn | 250/265 |
| 3,240,971 A | 3/1966 | Morgan | 376/153 |
| 3,359,443 A | 12/1967 | Givens | 376/153 |
| 4,445,036 A | 4/1984 | Selph | 250/370.05 |
| 4,829,191 A | 5/1989 | Boyar et al. | 250/496.1 |
| 6,426,504 B1 | 7/2002 | Menlove et al. | |
| 6,452,191 B1 | 9/2002 | Johnson et al. | 250/385.1 |
| 7,002,159 B2 | 2/2006 | Lacy | |

OTHER PUBLICATIONS

McGregor, M.C., Hammig, M.D., Yang, Y.-H., Gersch, H.K., and Klann, R.T., 2003, "Design Considerations for Thin Film Coated Semiconductor Thermal Neutron Detectors—I: Basics Regarding Alpha Particle Emitting Neutron Reactive Films," Nucler Instruments & Methods in Physics Research A, 500, pp. 272-308.
McNeil, W.J., Bellinger, S.L., Unruh, T.C., Henderson, C.M., Ugorowski, P., et al. 2009, "1-D Array of Performated Diode Neutron Detectors," Nuclear Instruments and Methods in Physics Research A, 604, pp. 127-129.
Shultis, J.K., and McGregor, D.S., 2009, "Design and Performance Considerations for Perforated Semiconductor Thermal-Neutron Detectors," Nuclear Instruments and Methods in Physics Research A, doi: 10.1016/j.nima.2009.02.033.
Unruh, T.C., Bellinger, S.L., Huddleston, D.E., McNeil, W.J., Patterson, E., et al., 2009, Design and Operation of a 2-D Thin Film Semiconductor Neutron Detector Array for Use as a Beamport Monitor, Nuclear Instrucments and Methods in Physics Research A, 604, pp. 150-153.

*Primary Examiner* — David P Porta
*Assistant Examiner* — Kiho Kim
(74) *Attorney, Agent, or Firm* — Pearne & Gordon LLP

(57) ABSTRACT

A neutron detector array that includes a hollow member circumscribing an axis and bounding a volume. A divider extends parallel to the axis within the hollow member to divide the volume into a plurality of volume portions. A plurality of anodes extend parallel to the axis; at least one anode within each volume portion. A plurality of cathodes wherein the hollow member has an interior surface and the divider has surfaces that are coated with neutron sensitive material. Also, a neutron detector that includes a hollow cathode bounding a volume portion with at least a partial wedge cross-section, and an anode extending thought the volume portion. An electric field exists during operation of the neutron detector within the volume portion, the electric field varying across the cross-section, and the anode being located at an area of maximum field strength within the field. The detector may be used in the array.

21 Claims, 3 Drawing Sheets

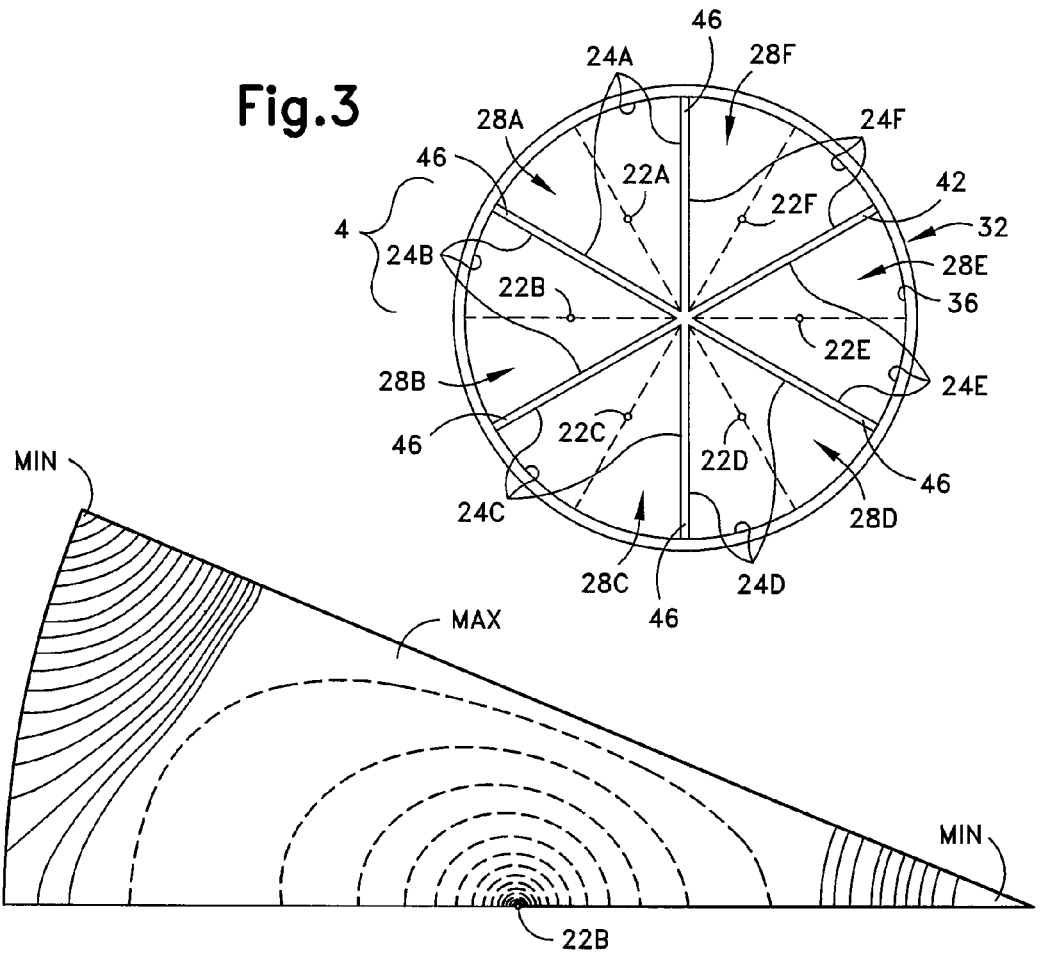
Fig.3
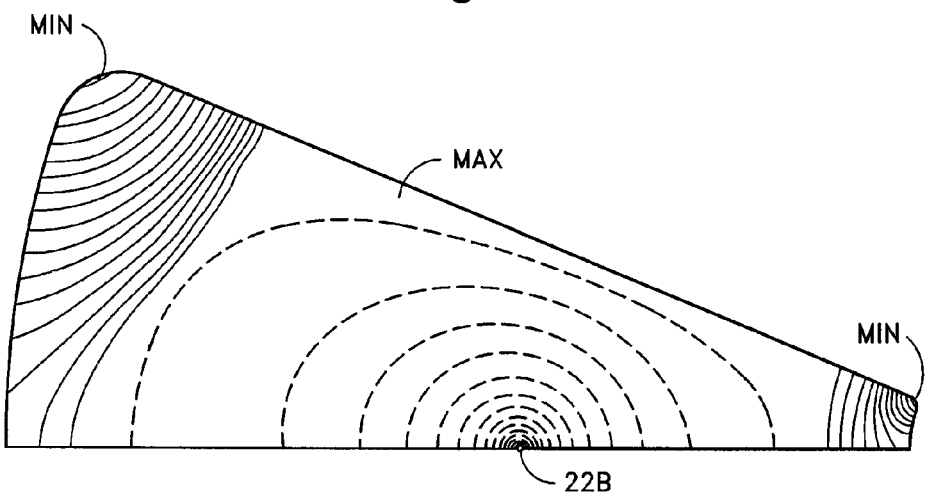
Fig.4
Fig.5

B10 NEUTRON DETECTOR IN PIE SHAPED SECTORS

BACKGROUND OF THE INVENTION

1. Field of the Invention

The invention relates to neutron detectors, and specifically relates to detectors that have improved space utilization and sensitivity.

2. Discussion of Prior Art

Recently, high sensitivity neutron detectors for homeland security have become increasingly important and increasingly in demand. Many known neutron detectors utilize He-3, a neutron sensitive material known to provide a detector of high sensitivity. The He-3 is provided within a volume that includes a cathode within a detection arrangement. Recently, the availability of He-3 has been has become insufficient to satisfy the demand associated with high sensitivity neutron detectors. Other than He-3 there are only a few neutron sensitive materials that are useful for constructing a neutron detector, including certain isotopes of uranium, lithium and boron.

Focusing for the moment upon the physical construction of neutron detectors and neutron detector arrangements, a neutron detector includes an anode and a cathode. One example detector includes a wire extending on an axis for the anode and a cylindrical cathode circumscribing the anode. Often, detector arrangements are configured to have a large number of individual detection pairs (i.e., a single cathode and a single anode) for high resolution. Logically, using plural detectors permits detection over a greater area that might be possible upon using just a single detector. For example, a single detector (i.e., a single anode and a single cathode) has a practical limitation on overall size.

Focusing upon boron, the majority (e.g., approximately 80%) of available boron is B-11, which has 5 protons and 6 neutrons, and the remainder (e.g., approximately 20%) is Boron 10 (B-10), which has 5 protons and 5 neutrons. Only the B-10 isotope is useful for neutron detection. Thus, for use in a neutron detector, it is typically desirable to enrich the concentration of B-10.

As mentioned, the detection of neutrons is based on the generation of secondary radiations. With B-10 ($^{10}$B) as the converter material, the reaction is described as follows when a neutron is captured:

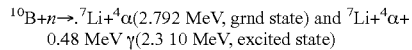

$^{10}$B+$n$→.$^7$Li+$^4$α(2.792 MeV, grnd state) and $^7$Li+$^4$α+ 0.48 MeV γ(2.3 10 MeV, excited state)

The energy released by the reaction is approximately 2.310 million electron volts (MeV) in 94% of all reactions (2.792 MeV in the remaining 6%), and equals the energy imparted to the two reaction products (the energy of the captured neutron is negligible by comparison). The reaction products, namely an alpha particle (α) and a lithium nucleus ($^7$Li) are emitted isotropically from the point of neutron capture by B-10 in exactly opposite directions and, in the case of the dominant excited state, with kinetic energies of 1.47 MeV and 0.84 MeV, respectively.

Turning back to physical construction of neutron detector arrangements, with respect to a pair of side by side He-3 detectors, each detector's diameter is often relatively small since the sensitivity is relatively high. This allows good position resolution (i.e., the ability to discriminate neutron trajectory determination. A new generation of neutron detectors would be most beneficial if the new generation detectors provided a similar level of resolution as existing He-3 detectors without significant change to overall dimensions of the detectors. Equally important is that the new generation of detectors must be physically similar to existing detectors so they can be easily retrofitted and must have comparable neutron sensitivity and gamma rejection as He-3.

As mentioned, the use of B-10 for neutron detection is known. However, the use of B-10 in known sensor configurations (i.e., plated onto the cathode structure of known sensors) is associated with insufficient sensitivity. Specifically, B-10 coating on the cathode structure is relatively thin and such detectors achieve only a few percent efficiency, due to the fact that the thicknesses needed for a substantial capture of neutrons exceeds the escape range of the neutron capture reaction products. In one example, the optimal thickness of a B-10 coated detector is 0.4 mg/cm$^2$. So in many instances, capture reaction products cannot escape. Only conversions of neutrons in a very thin layer near the surface of the B-10 adjacent the counting gas are detected efficiently. Since this very thin, top layer of the B-10 coating captures only a very small percentage of the incident neutrons, efficiency of a neutron detector of such simple design is understandably low.

A new generation of approaches to neutron detectors would be most beneficial if the new generation provided at least a similar level of neutron sensitivity and a discrimination of gamma rays without significant change to overall dimensions of the detectors.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

One aspect of the invention provides a neutron detector array that includes a hollow member extending along and circumscribing an axis. The hollow member bounds a volume. The array includes a divider extending parallel to the axis within the hollow member to divide the volume into a plurality of volume portions. The array includes a plurality of anodes extending parallel to the axis. At least one anode being located within each volume portion. The array includes a plurality of cathodes, wherein the hollow member has an interior surface and the divider has surfaces that are coated with neutron sensitive material.

Another aspect of the invention provides a neutron detector that includes a hollow cathode bounding a volume portion with at least a partial wedge cross-section, and an anode extending thought the volume portion. An electric field exists during operation of the neutron detector within the volume portion, the electric field varying across the cross-section, and the anode being located at an area of maximum field strength within the field.

BRIEF DESCRIPTION OF THE DRAWINGS

The foregoing and other aspects of the invention will become apparent to those skilled in the art to which the invention relates upon reading the following description with reference to the accompanying drawings, in which:

FIG. 3 is a schematic view of the example array taken along line 3-3 in FIG. 1 and shows six volume portions within the example array, with each volume portion having at least a partial wedge cross-section;

FIG. 4 is an electric field gradient map of one half of one volume portion taken in cross-section of the example detector of FIGS. 1-3, with the mapped area being indicated by the bracket reference 4 within FIG. 3, and shows placement of an anode within the gradient map and thus within the associated volume portion;

FIG. 5 is a gradient map similar to FIG. 4, but is for a volume portion that is truncated at a radially inward end to permit the presence of structure in accordance with another embodiment of the neutron detector array;

DETAILED DESCRIPTION OF THE INVENTION

Figure 1:
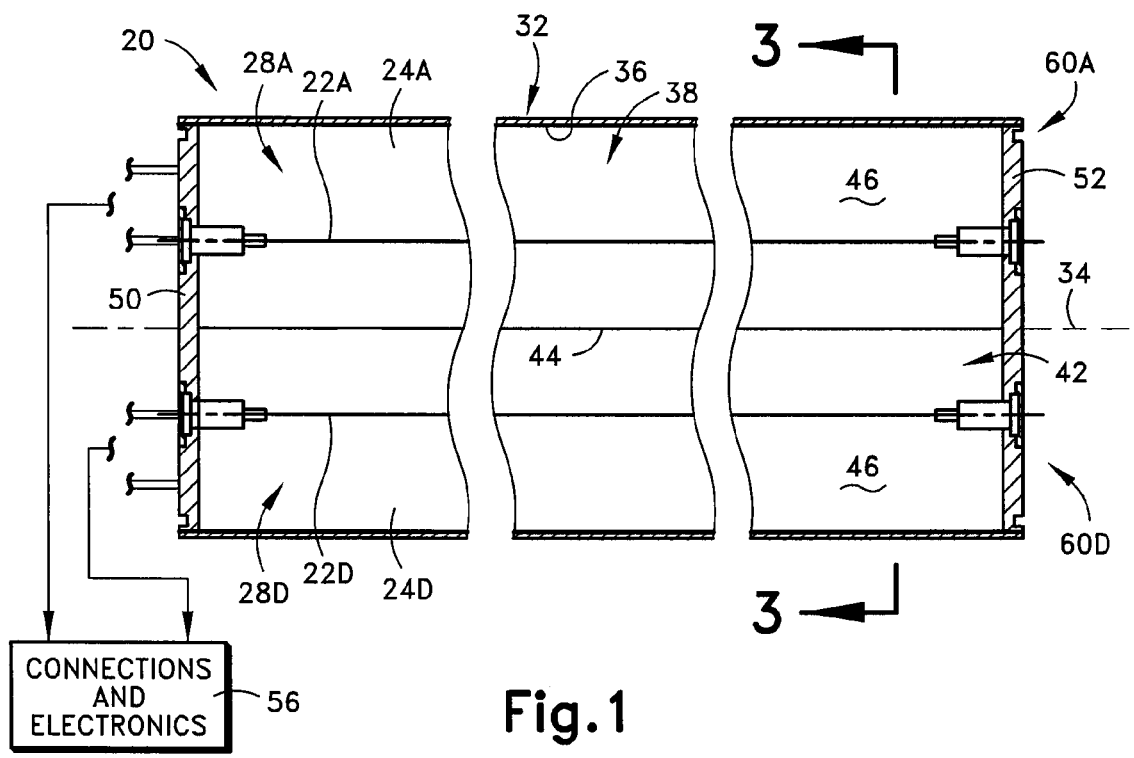
FIG. 1 is a schematic cross-section of an example neutron detector array in accordance with one aspect of the invention.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

Figure 2:
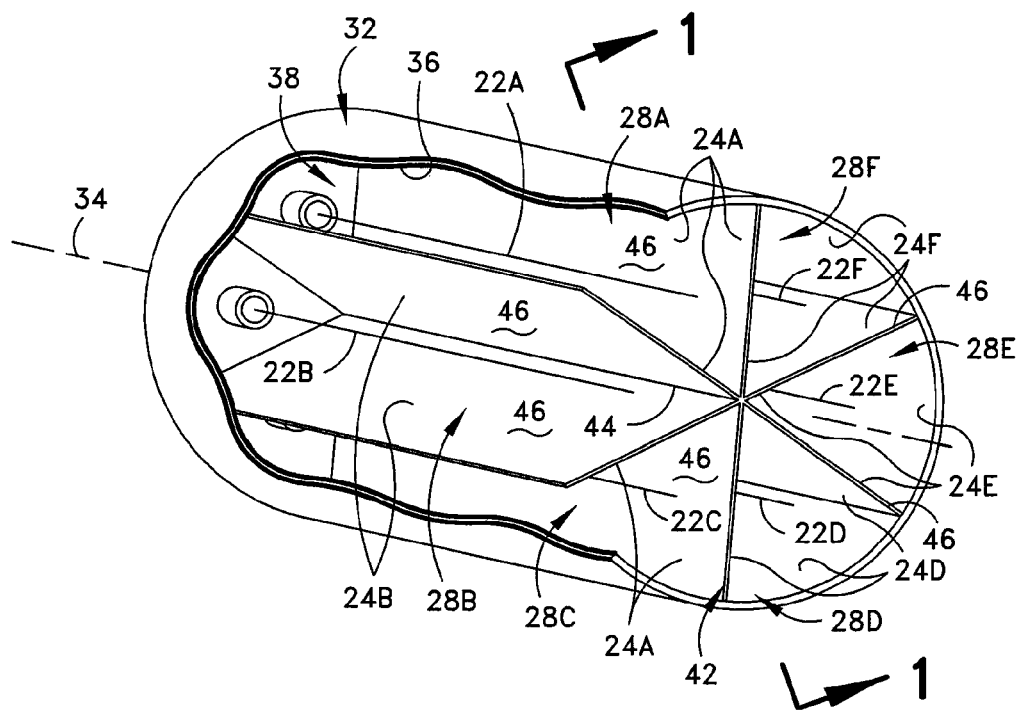
FIG. 2 is perspective view of the example array of FIG. 1, which has been partially torn open to better show some structural aspects, with the orientation relationship between FIGS. 1 and 2 being indicated by line 1-1 in FIG. 2 to indicated the section location for FIG. 1.

An example embodiment of a neutron detector array 20 that includes one aspect of the invention is shown in FIG. 1. Basically, the neutron detector array 20 includes a plurality of electrode pairs (only two pairs are shown in FIG. 1). Each electrode pair is an anode 22 and a cathode 24. In the shown example, there are six anode/cathode pairs 22A/24A-22F/24F. FIGS. 2 and 3 show the six anode/cathode pairs 22A/24A-22F/24F, while FIG. 1 just shows two anode/cathode pairs (i.e., 22A/24A, 22D/24D). Of course a different number of anode/cathode pairs may be provided. For specific reference the anodes and cathodes are identified using the alphabetic suffixes A-F. However, for discussions that are generic to all of the anode/cathode pairs, the alphabetic suffixes A-F may be omitted. In the example of FIG. 1, each anode 22 is located within a separated volume portion 28. Specifically, in the example of FIG. 1, there is a plurality of volume portions 28A-28F respectively associated with the plurality of electrode pairs. Here also, the alphabetic suffixes A-F are used for specific reference and may be omitted for generic discussion.

Focusing upon the structure that provides the volume portions 28A-28F, a hollow tubular member 32 extends along and circumscribing an axis 34. In the shown example, the hollow member 32 is cylinder shaped. However, other shapes may be utilized. An inner surface 36 of the hollow member 32 circumferentially bounds an overall volume 38. A divider 42 extends parallel to the axis 34 within the hollow member 32 to divide the volume 38 into the plurality of volume portions 28A-28F. In the shown example, the divider 42 has a center 44 located on the axis 34 and has six fin spokes 46 extending radially outward from the axis 34 to engage the hollow member 32. The fin spokes 46 are evenly spaced about the axis (i.e., at 60° intervals). Thus, the volume portions are all the same (i.e., same shape and size).

Each pair of fin spokes 46 that are on opposite sides of the axis 34 bisect a circular cross-section of the hollow member 32. FIGS. 2 and 3 show that the example volume portions 28A-28F are pie piece shaped when viewed along the axis 34. Each pie piece shape has the aspect of being at least partially wedge shaped since there is a tapering toward one end.

It should be appreciated that the divider 42 can be considered to have a star appearance and may be made as a single piece, such as by extrusion or molding. The divider 42 may also be made of separate pieces connected together in such a manner as to be placed to intersect at the axis 34. Also, it is possible that the divider 42 is not centered on the axis 34 and that the volume portions 28 are not equal. Thickness of the divider 42 and fin spokes 46 thereof may be varied dependent upon overall size of the hollow member 32, etc.

Axial ends of the hollow member 32 are closed and sealed with end caps 50, 52 to completely bound and seal the overall volume 38 and thus the volume portions 28A-28F. The sealed volume 38 contains a gas, such as argon or carbon-dioxide. Specifically, the gas is within all of the six volume portions 28A-28F at substantially the same pressure and density.

Focusing upon the anodes 22, each anode (schematically shown in FIG. 1) is electrically conductive and electrically connected to electronics 56 (schematically shown) as will be appreciated by the person of skill in the art. In the shown example, each anode 22 is elongate and extends parallel to the axis 34. In one example, the anode 22 is a wire that is in the range of 0.0254-0.0508 mm (0.001-0.002 inches) in diameter. As mentioned, such a size range is merely an example. Accordingly, such an example should not be considered to be a limitation upon the invention.

As mentioned, each anode (e.g., 22A) is paired with a cathode (e.g., 24A) and associated with one of the volume portions (e.g., 28A). Each respective cathode (e.g., 24A) includes a segment of the hollow member inner surface 36 that is exposed to the associated volume portion (e.g., 28A) and surfaces of the two divider fin spokes 46 that bound the associated volume portion. These three surfaces are coated with a layer of neutron sensitive boron material. So in one respect the hollow member 32 and the divider 42 provide the substrate for the neutron sensitive boron coating material. In one specific example, the boron coating material is enriched to have a high content of B-10. One example of a high content of B-10 is a content of B-10 greater than 90%. Each cathode (e.g., 24A) is operatively connected to the associated electronics 56. Microscopic surface enhancement features can be provided upon any or all of the surfaces of the cathode(s). The microscopic surface enhancement features provide for additional surface density and thus provide for increased boron surface area.

In operation, each anode/cathode pair (e.g., 22A/24A) with a respective volume (e.g., 28A) is a separate neutron detector 60 (see FIG. 1, which shows two, 60A and 60D, of the six detectors present within the example). As such, sensing of a neutron may occur at any of the six neutron detectors 60 (which could be considered 60A-60F, with alphanumeric suffixes corresponding to the above use of alphanumeric suffixes). Each neutron detector (e.g., 60A) is operatively connected to the associated electronics 56. All six of the neutron detectors 60 are operatively connected to the electronics (only two example connections are schematically shown in FIG. 1 for the two neutron detectors 60A and 60D shown therein).

As a brief explanation, the process of neutron detection is generically explained with the understanding that the explanation is applicable to each of the six neutron detectors 60. The detection is accomplished by a current pulse that occurs between the anode 22 and cathode 24, through the gas in the volume portion 28, when a neutron impinges upon the B-10 boron of the cathode. When a neutron is absorbed by a B-10 atom in the layer on the cathode 24, an alpha particle (i.e., a helium-4 nucleus) and lithium-7 nucleus, both positively charged, are generated and are ejected in opposite directions along a straight line, the orientation of which is random. One of these particles will not emerge from the B-10 layer because its direction of motion is towards the cathode. The other particle moves towards the gas/coating interface from which it will emerge if it has enough energy. When one of these nuclear particles passes into the gas within the volume portion 28, the gas is ionized. The negative ion particles, electrons, drift towards the anode 22 and as the negatively charged particles approach sufficiently near the anode (e.g., within 1-3 anode diameters) the negatively charge particles accelerate to the point of generating even more charge. This is called "gas gain" and it generates enough charge so that the resulting current has a perceptible effect within the associated electronics 56 operatively connected to the respective neutron detector (e.g., 60A). Thus, the current at the anode (e.g., 22A) is detectable and quantifiable. It is to be appreciated that in one example, the associated electronics 56 includes an electronic amplifier in order to aid in processing the current generated at the anode (e.g., 22A). It is to be appreciated that general operation/structure of neutron detectors and associated electronics arrangements will be appreciated by the person of skill in the art.

It is to be appreciated that the hollow member 32 of the neutron detector array 20 of the shown example may be shaped (e.g., cylindrically) and sized, substantially the same as the shape and size of a single previously known neutron detector. However, in view of the fact that the neutron detector array 20 of the present invention has a plurality (six in the example embodiment of FIGS. 1-3) of neutron detectors 60A-60F, it is contemplated that the neutron detector array of the present invention may have a greater ability to provide improved resolution. In other words, instead of a neutron being detected by a known neutron detector with just a single anode/cathode pair, the neutron could be detected by one of the plural of neutron detectors in accordance with one aspect of the invention. Since the plural neutron detectors each define a comparatively smaller space, a greater amount of spatial resolution of the location of neutron detection is possible. Of course, a different number, such as four, of detectors could be provided.

Along the same lines, it is to be acknowledged that there is often a desire for a neutron detector or array to be of particular size. In one example, a neutron detector array that includes B-10 within the cathodes would be sized the same as a single neutron detector that includes He-3 within the cathode. This would allow the neutron detector array that includes B-10 within the cathode to be a good physical size replacement for the neutron detector that includes He-3. It is worth noting that a neutron detector that includes He-3 can vary in size, but since He-3 neutron detectors are appreciated to have a fairly high sensitivity and a relatively small size, many such He-3 detectors can be placed into a small area for high resolution. A typical range of sizes for neutron detectors that includes He-3 within a cylindrical cathode is 8 mm (0.31496 inch) to 50.8 mm (2 inches) in diameter.

In order to provide a desired size of a B-10 neutron detector array (e.g., generally equal size of a He-3 neutron detector) and yet obtain desired sensitivity (e.g., generally equal sensitivity of a He-3 neutron detector), one aspect of the invention provides for the provision of the divider, and thus separation of the overall volume into separated volume portions. Such an approach includes the use of a greater amount of surface area to be coated with neutron sensitive material (e.g., B-10) than the amount of surface area that would be utilized for the single cathode within a comparable sized He-3 neutron detector. Also, the aspect of the invention does provide multiple neutron detectors without space between the detectors, since the fin spokes 46 of the divider 42 are utilized for two adjacent neutron detectors.

In one example of 6 volume portions, the invention could be considered to provide a sensitivity enhancement factor over a single cylinder with just the inner surface of the cylinder coated with neutron sensitive material. Specifically, the factor could be considered to be $6/\pi$ or approximately 1.91.

It is to be appreciated that the cross-sectional area of each volume portion 28 has some asymmetric properties. Each volume portion 28 is only symmetric about a plane that bisects the volume portion extending radially outward from the axis 34 between the two fin spokes 46 that help bound the respective volume portion. Such a bisecting plane is represented in FIG. 3 with a dashed line extending in each volume portion 28. As mentioned earlier each volume portion 28 is at least a partially wedge-shaped since there is a tapering toward one end. So, the wedge shape prevents certain symmetry. Still further, the curvature of the volume portion 28 at the radial outermost extent due to the curvature of the hollow member 32 prevents certain symmetry.

Often, for an anode and cathode electrode pair there is desire to have symmetry in the positional relationship of the electrode pair. However, since the neutron detector array 20 of the example of FIGS. 1-3 lacks many levels of symmetry, another aspect of the invention is selective placement of each respective anode 22 within the associated volume portion 28. Attention is directed to FIG. 4, which shows placement of an anode 22 relative to one half of an example volume portion 28 taken in cross-section of the example detector array 20 of FIG. 1. For the sake of reference, FIG. 4 is the portion shown in FIG. 3 identified by the space bracket 4 (of course the selected portion is equally representative of any of the other portions could be utilized). Note that the anode 22 is on one side (bottom side in FIG. 4). It is to be appreciated that with the other half of one volume portion being on the other side of the anode, the anode 22 is located on the single line of symmetry (i.e., the dashed line shown in FIG. 3) of the pie-piece shaped volume portion. FIG. 4 shows a gradient map on the shown one half of the associated volume portion.

One gradient mapping that is shown in FIG. 4 is a voltage field or V-field extending outward from the anode. This V-field gradient mapping is shown via dash lines. Each line indicates iso-potential. In the shown example, each line represents a change of 50 volts. Another gradient mapping that is shown in FIG. 4 is an electric field or E-field that is created within the volume portion 28. This E-field gradient mapping is shown via solid lines. In the example of FIG. 4, the E-field has a range of approximately 0 to 8000 V/m. The E-field has minimum strength (e.g., nearing zero V/m) at the pointed tip (right side of FIG. 4) and at the upper left corner, and the E-field increases (i.e., crossing the gradient lines) toward the middle area of the wedge-shape. A bulk or majority of the shown cross-sectional area is included within the region of higher E-field gradient (e.g., approximately 8000 V/m).

As such, it is to be appreciated that one aspect of the present invention is to place the anode 22 within the volume portion such that a maximum amount of the cross-sectional area is included within a region of higher E-field gradient. This is done via gradient mapping and is done taking into account the asymmetry that may be present for the volume portion 28. In other words, gradient mapping is useful to determine desired anode placement within an asymmetric volume.

It should be appreciated that the E-field gradient mapping is dependent on both the anode 22 placement and the shape of the volume portion 28. Attention is directed to FIG. 5, which is similar to FIG. 4 (i.e., shows placement of an anode relative to one half of an example volume portion taken in cross-section and a gradient map) and yet is different from FIG. 4. One primary difference is that the volume portion associated with FIG. 5 has a different cross-section area. The cross-section area in FIG. 5 does not have a pointed segment toward the right. Instead, the wedge-shape is truncated. This shape feature may be provided via a divider that has an enlarged center. Also, the cross-section area has a rounded corner (see upper left corner in FIG. 5). This shape feature may be provided by the fin spokes of the divider having a thickening cross-section as the fin spokes reach to engage the inner surface of the hollow member. The other half of the volume portion would be a mirror image (i.e., on the line of symmetry) and thus have the same features (i.e., truncated wedge tip and a rounded corner).

The volume portion shape features presented in connection with FIG. 5 help to provide for higher field values in the volume portion at the areas of the shape features (i.e., truncated wedge tip and a rounded corner). For FIG. 5, the E-field gradient mapping is shown via solid lines and the V-field gradient mapping is shown via dashed lines). In one example, the E-field goes to a minimum in the range of approximately 900-2600 V/m at the rounded corner and the truncated tip. This is in distinction to the minimum E-field that nears zero for the example of FIG. 4.

Figure 6:
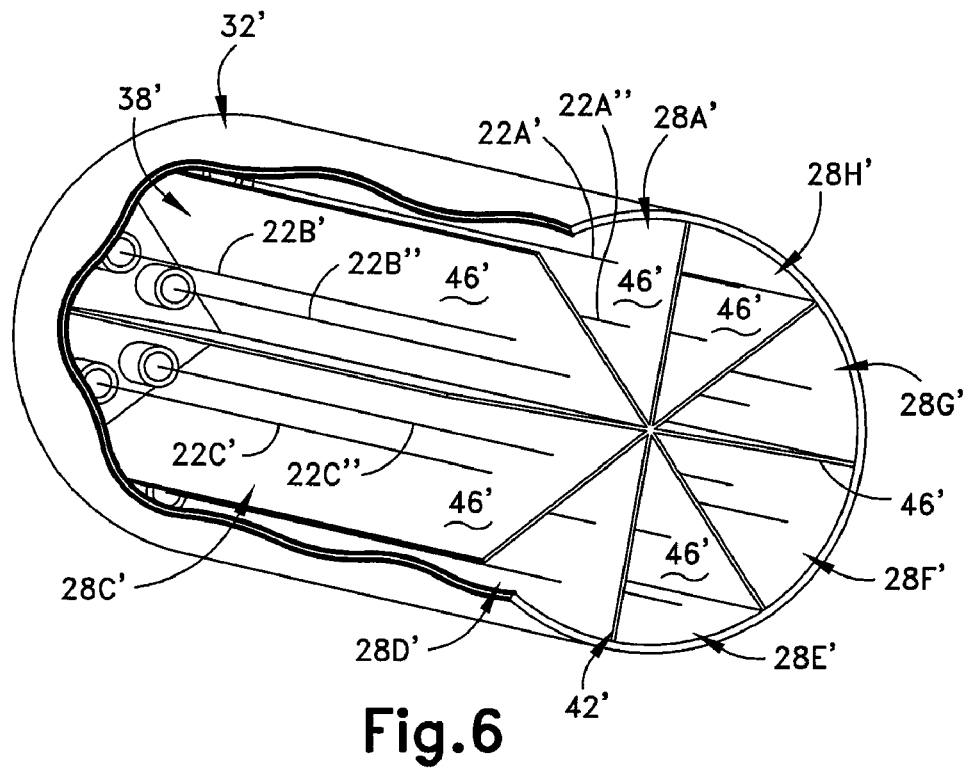
FIG. 6 is view similar to FIG. 2, but is for yet another embodiment of the neutron detector array which has eight volume portions and which also has two anodes for each volume portion.

It should be appreciated that the invention is contemplated as encompassing various modifications. For example, FIG. 6 shows a first modification with an overall volume 38' of a cylindrical hollow member 32' that is divided into eight separated volume portions 28A'-28H'. It should be noted that similar references numbers are used, but a "'" (prime) is added to identify that some difference from the example of FIGS. 1-3 exist. A divider 42' has eight fin spokes 46'. Similar to the embodiment shown in FIGS. 1-3, the surfaces of the divider 42' and the inner surface of the hollow member 32' are coated with neutron sensitive material (e.g., B-10). The example of FIG. 5 could be considered to provide a sensitivity enhancement factor over a single cylinder with just the inner surface of the cylinder coated with neutron sensitive material of a factor of $8/\pi$ or approximately 2.55. Thus, it should be apparent that the number of volume portions may be varied and that the variation may provide different levels of improved sensitivity.

FIG. 6 shows another modification example. Specifically, FIG. 6 shows that the number of anodes within each volume portion may be varied. In the shown example, two anodes (e.g., 22A' and 22A") are provided within each volume portion (e.g., 28A'). It should be noted that similar references numbers from the example of FIGS. 1-3 are used, but a "'" (prime) and a "''" (double prime) are added to identify the two anodes. Of course, each anode would be operatively connected to an electronics arrangement. It is worth noting that the presence of multiple anodes within a single volume portion will provide for a different gradient map for the E-field and the V-field within the respective volume space as compared to the gradient map provided by a single anode.

Figure 7:
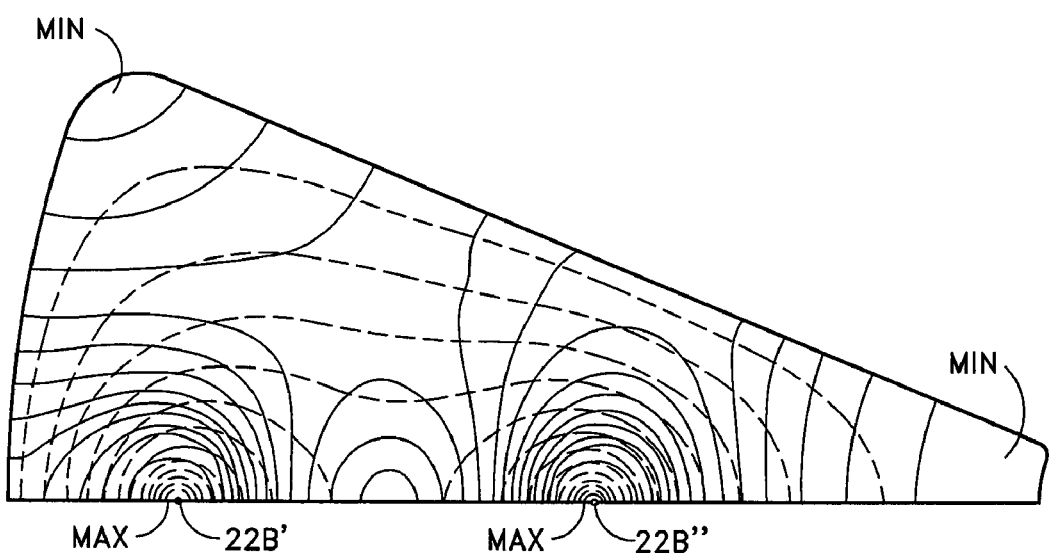
FIG. 7 is a gradient map similar to FIG. 5, but for still another embodiment of the neutron detector array that has two anodes for each volume portion and with a volume portion that is truncated at a radially inward end.

FIG. 7 is one example of a gradient map that is similar to FIG. 5 (i.e., the volume portion associated with both FIGS. 5 and 7 do not have a pointed segment toward the right and has a rounded corner in the upper left corner). For FIG. 7, the E-field gradient mapping is shown via solid lines and the V-field gradient mapping is shown via dashed lines). The difference that FIG. 7 has is that two anodes are placed in the bisecting line of the volume portion (thus on the side of the one-half that is shown in FIG. 7). As can be seen, the E-field (shown by solid lines) has areas of region of higher strength around the anodes and most of the cross-sectional area has a relatively low E-field strength. In one example, the gradient mapping shown in FIG. 7 extends from values at or near zero to values in the range of approximately $2*10^5$ V/m. From such example it should be appreciated that multiple anodes are possible and that positioning of the multiple anodes may provide an ability to establish selective field values at selective locations within the separated volumes. Thus, it is contemplated that issues concerning asymmetry of a separated volume portion may be addressed via field gradient mapping and/or anode placement and/or configuring the cross-section of the volume portion and/or use of multiple anodes with the volume portion.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

The invention claimed is:

1. A neutron detector array including:
   a hollow member extending along and circumscribing an axis, the hollow member bounding a volume;
   a divider extending parallel to the axis within the hollow member to divide the volume into a plurality of volume portions;
   a plurality of anodes extending parallel to the axis, at least one anode being located within each volume portion; and
   a plurality of cathodes wherein the hollow member having an interior surface and the divider having surfaces that are coated with neutron sensitive material.

2. A neutron detector array as set forth in claim 1, wherein the hollow member has a cylindrical shape.

3. A neutron detector array as set forth in claim 1, wherein the divider is centered on the axis.

4. A neutron detector array as set forth in claim 1, wherein the plurality of volume portions are all the same size and shape.

5. A neutron detector array as set forth in claim 1, wherein at least one volume portion has at least a portion that is wedge-shaped in cross-section taken perpendicular to the axis.

6. A neutron detector array as set forth in claim 1, wherein the plurality of volume portions includes at least four volume portions.

7. A neutron detector array as set forth in claim 1, wherein the plurality of volume portions includes at least eight volume portions.

8. A neutron detector array as set forth in claim 1, wherein the hollow member and the divider are elongate along the axis.

9. A neutron detector array as set forth in claim 1, wherein the divider includes a plurality of fin spokes, each fin spoke extending to separate adjacent volume portions.

10. A neutron detector array as set forth in claim 9, wherein the fin spokes of the divider are coated with the neutron sensitive material.

11. A neutron detector array as set forth in claim 1, wherein the neutron sensitive material is B-10.

12. A neutron detector array as set forth in claim 1, wherein at least two anodes are located within each volume portion.

13. A neutron detector array as set forth in claim 1, wherein the volume portions each have a pie piece shape in cross-section taken perpendicular to the axis.

14. A neutron detector array as set forth in claim 1, wherein volume portions each have a general pie piece shape in cross-section taken perpendicular to the axis, with a truncation at a taping portion of the pie piece.

15. A neutron detector array as set forth in claim 1, wherein volume portions each have a general pie piece shape in cross-section taken perpendicular to the axis, with a rounded corner at a widest portion of the pie piece.

16. A neutron detector array as set forth in claim 1, wherein each volume portion includes at least a partial wedge cross-section taken perpendicular to the axis, an electric field exists within each volume portion during operation of the neutron detector array, the electric field varying across the cross-section of the volume portion, and the anode being located at an region of higher field strength within the field.

17. A neutron detector array as set forth in claim 16, wherein for each volume portion the hollow member, the divider and the anode are configured such that the region of higher field strength of the field extends over a majority portion of the cross-section taken perpendicular to the axis.

18. A neutron detector array as set forth in claim 1, wherein the plurality of cathodes have microscopic surface enhancements for receiving the neutron sensitive material.

19. A neutron detector including: a hollow cathode bounding a volume portion with at least a partial wedge cross-section; and an anode extending through the volume portion; wherein an electric field exists during operation of the neutron detector within the volume portion, the electric field varying across the cross-section, and the anode being located at an area of maximum strength within the electric field.

20. A neutron detector as set forth in claim 19, wherein the detector is part of a neutron detector array, the detector array includes:
   a hollow member extending along and circumscribing an axis, the hollow member bounding a volume, the volume portion of the neutron detector being part of the volume;
   a divider extending parallel to the axis within the hollow member to divide the volume into a plurality of volume portions; and
   a plurality of anodes extending parallel to axis, at least one anode being located within each volume portion;
   the hollow member having an interior surface and the divider having surfaces that are coated with neutron sensitive material to provide a plurality of hollow cathodes, with each volume portion having a separate one of the cathodes.

21. A neutron detector as set forth in claim 19, wherein the cathode and the anode are configured such that the region of higher field strength of the field extends over a majority portion of the at least a partial wedge cross-section.

* * * * *